(12) United States Patent
Warner et al.

(10) Patent No.: US 8,412,439 B2
(45) Date of Patent: Apr. 2, 2013

(54) DUAL FUEL ENGINE CONTROL UNIT

(75) Inventors: Nick Warner, Cambridgeshire (GB); John King, Cambs (GB); Trevor Lee Fletcher, Leicestershire (GB)

(73) Assignee: T.Baden Hardstaff Ltd., Nottingham (GB)

( * ) Notice: Subject to any disclaimer, the term of this patent is extended or adjusted under 35 U.S.C. 154(b) by 422 days.

(21) Appl. No.: 12/733,760

(22) PCT Filed: Sep. 18, 2008

(86) PCT No.: PCT/GB2008/003188
§ 371 (c)(1),
(2), (4) Date: Jun. 14, 2010

(87) PCT Pub. No.: WO2009/037476
PCT Pub. Date: Mar. 26, 2009

(65) Prior Publication Data
US 2011/0288745 A1  Nov. 24, 2011

(30) Foreign Application Priority Data
Sep. 18, 2007 (GB) .................................. 0718126.6

(51) Int. Cl.
F02M 43/00 (2006.01)
F02M 43/04 (2006.01)
(52) U.S. Cl. ........................ 701/103; 123/304
(58) Field of Classification Search .................. 701/102, 701/103, 104, 105; 123/299, 300, 304, 575, 123/576, 578, 480, 27 GE, 525, 526
See application file for complete search history.

(56) References Cited

U.S. PATENT DOCUMENTS

| 4,576,137 A | 3/1986 | Tanaka |
| 4,603,674 A | 8/1986 | Tanaka |
| 6,591,817 B2 | 7/2003 | Deutsch |
| 7,093,588 B2 | 8/2006 | Edwards |

(Continued)

FOREIGN PATENT DOCUMENTS

| DE | 10301298 | 7/2003 |
| EP | 720690 | 7/1996 |

(Continued)

OTHER PUBLICATIONS

Third Party Observations filed at UK IPO on GB Application No. 0718126.6 by Factorgraft Ltd.

(Continued)

Primary Examiner — Mahmoud Gimie
(74) Attorney, Agent, or Firm — Ryan Kromholz & Manion, S.C.

(57) ABSTRACT

A multi-mode engine system comprising a first mode in which the engine is fuelled substantially entirely by a first fuel, and a second mode in which the engine is fuelled substantially entirely by a second fuel, or by a mixture of the first and second fuels, the engine comprising: a first engine control unit (ECU) for controlling the flow of the first fuel into the engine when the engine is operating in the first mode; and a second ECU operatively connected to the first ECU; wherein the first ECU comprises: a signal receiver for receiving the first input signals, and an output for emitting a first output signal; and the second ECU being adapted to modify the first output signal when the engine is running in the second mode to produce a first modified signal and a second calculated signal.

20 Claims, 6 Drawing Sheets

U.S. PATENT DOCUMENTS

| | | |
|---|---|---|
| 2003/0139872 A1 | 7/2003 | Miki |
| 2003/0187565 A1* | 10/2003 | Wong .......................... 701/103 |
| 2004/0111210 A1 | 6/2004 | Davis et al. |

FOREIGN PATENT DOCUMENTS

| | | |
|---|---|---|
| EP | 872634 | 10/1998 |
| EP | 0872634 | 10/1998 |
| EP | 1174608 | 1/2002 |
| GB | 2372835 | 9/2002 |
| GB | 2437098 | 10/2007 |
| GB | 2447046 | 9/2008 |
| JP | 08284704 | 10/1996 |
| JP | 2003097326 | 4/2003 |
| JP | 2003206774 | 7/2003 |
| JP | 2006336499 | 12/2006 |
| JP | 2008232043 | 10/2008 |
| WO | 03/074856 | 9/2003 |
| WO | 03/076788 | 9/2003 |
| WO | 2004/029438 | 4/2004 |
| WO | WO2008/104764 | 9/2008 |

OTHER PUBLICATIONS

Third Party Observations filed at UK IPO on GB Application No. 0718126.6 by Flitch Limited.

UK Intellectual Property Office Search Report for GB0718126.6, Nov. 28, 2007.

International Search Report for PCT/GB2008/003188; 1/281/09.

Australian Patent Application No. 2008300435 Office Action dated Dec. 14, 2011.

* cited by examiner

DUAL FUEL ENGINE CONTROL UNIT

BACKGROUND OF THE INVENTION

This invention relates to an engine control unit (ECU) for a multi-mode engine, and particularly, but not exclusively to an ECU for a dual fuel engine, and to a multi-mode engine comprising such an ECU.

A multi-mode engine is capable of operating in a plurality of different modes, each mode having a different fuel requirement. In other words, a multi-mode engine is powered by different fuels or combinations of fuels in the different modes.

A dual fuel engine is adapted to operate in two modes. Typically a first mode is a diesel mode in which the engine is fuelled solely by diesel fuel, and a second mode is a gaseous fuel mode in which the engine is fuelled predominantly by a gaseous fuel such as natural gas (methane) which is ignited by a relatively small quantity of diesel.

A dual fuel engine may of course run on different types of fuel. The first fuel could be, for example a biodiesel fuel, synthetic fuel or any number of alternative fuels. Similarly, the second fuel does not have to be methane and could be for example, compressed natural gas, biomethane, ethanol, methanol, or hydrogen to name but a few.

The operation of an engine such as an internal combustion engine on a mixture of a liquid fuel such as diesel, and a gaseous fuel such as methane increases the fuel economy and engine efficiency of the engine, whilst at the same time maintaining low levels of undesirable exhaust emissions. As people generally become more aware of the disastrous effect on the environment and weather of the consumption of hydrocarbon fuels, there is greater need to reduce carbon emissions from vehicles such as heavy goods vehicles. One way in which these emissions can be reduced is by powering such vehicles with dual fuel engines which, for at least some of the time, are fuelled predominantly by methane, for example.

Whilst it is known to manufacture engine systems that are able to operate on both diesel and methane, there are many existing conventional diesel engines which cannot be simply replaced for economic reasons.

There is therefore a need to be able to convert existing internal combustion engines designed to run on, for example, diesel, into dual fuel engines which may run on diesel or methane, or a combination of two or more fuels.

A problem encountered with converting existing engines is that existing diesel engines, particularly of the unit injector or common rail type, are controlled by an electronic ECU. This ECU, known as a diesel ECU, controls the injection of diesel into the engine. The ECU comprises an engine map which is essentially a three-dimensional data array installed by the Original Equipment Manufacturer (OEM) which allows the diesel ECU to determine the amount of diesel to be injected into the engine, and the timing of the injection, depending on various parameters. The amount of diesel injected into the engine provides appropriate energy to the engine, taking into account prevailing conditions.

A known engine system comprises a plurality of sensors which measure a plurality of variables such as:
Accelerator Pedal position;
Intake Manifold pressure;
Engine temperature;
Vehicle speed;
Engine speed;
Engine position;
Oil pressure; and
Fuel pressure.

The sensors supply the ECU with information relating to these parameters. The engine mapping enables the ECU to determine the required level of fuel injection dependent on these parameters, and also in conjunction with other components with ECUs on the vehicle, such as electronic gearbox control, electronic braking systems, and traction control. Typically component ECUs will share information through a controller area network (CAN), and can have an effect on the final required level of fuel injection.

The diesel ECU instructs each of the injectors of the engine to inject a predetermined amount of diesel into the engine at a predetermined time dependent on the parameters measured, by sending a pulse signal to the injector. The injector is generally controlled by the width of the pulse and therefore pulse width modulation may be used to vary the amount of fuel injected into the engine. The diesel ECU also controls the timing of injection of diesel into the engine by each of the injectors.

If an engine is to be adapted to run in a second mode in which a mixture of diesel and methane is to be used to fuel the engine, the ECU must be adapted to instruct each of the diesel injectors to inject less diesel into the engine when the engine is running in the second mode. In order to enable the ECU to instruct each of the injectors appropriately when the engine is running in the second mode, it has previously been thought necessary to alter the engine map of the ECU.

In other words, when the engine is running in the second mode, less diesel is required to be injected into the engine per unit time than when the engine is running on diesel only.

However, OEMs generally do not provide information about or access to the engine map of the diesel ECU, and it is usually not possible therefore to access fuel maps in existing diesel ECUs.

It is necessary for the diesel ECU to remain active even when the engine is running in the second mode in order that the ECU can continue to control other engine components. It is therefore not possible to completely by-pass the diesel ECU which must continue to operate whenever the engine is running in whichever mode, to maintain built in safety features.

BRIEF SUMMARY OF THE INVENTION

According to a first aspect of the present invention there is provided a multi-mode engine system comprising an engine adapted to operate in a plurality of different modes including a first mode in which the engine is fuelled substantially entirely by a first fuel, and a second mode in which the engine is fuelled substantially entirely by a second fuel, or by a mixture of the first and second fuels, the engine comprising:
  a first engine control unit (ECU) for controlling the flow of the first fuel into the engine when the engine is operating in the first mode;
  a plurality of first sensors operatively connected to the first ECU, each of which first sensors is adapted to sense a first variable, and to emit a first input signal dependent on a value of the sensed first variable; and
  a second ECU operatively connected to the first ECU;
  wherein the first ECU comprises:
  a signal receiver for receiving the first input signals, and an output for emitting a first output signal dependent on the first input signals, which first output signal determines the amount of first fuel supplied to the engine,
  the second ECU being adapted to modify the first output signal when the engine is running in the second mode to produce a first modified signal and a second calculated signal; the first modified signal determining the amount of first fuel supplied to the engine when the engine is operating in the second mode, and the second calculated signal determining the amount of second fuel supplied to the engine when the engine is operating in the second mode.

An advantage of the emulator of the second ECU being adapted to modify the first output signal from the first ECU is that the function of the first ECU is unaffected by the modifications to the output signal. In other words, because the first input signals which are transmitted to the first ECU from the first sensors are not modified, the first ECU will receive information regarding the conditions under which the engine is running from the sensors and will then be able to control all other electrical components in the engine system regardless of the mode in which the engine is running in accordance with the first input signals, in the manner that the OEM intended.

The means by which the first ECU is adapted to have a controlling influence over other electrical components in the engine may vary from engine to engine but typically, all electrical components are connected to the first ECU by a CAN loop (Controller Area Network loop). The CAN loop is a bus system which enables components within the engine system to access signals from other components in order to obtain required information without modifying the signals which are then available for other components to access.

In an engine system in which the first ECU is connected to and has a controlling influence over the other components in the engine assembly by a CAN loop, signals transmitted by the ECU to the other components via the CAN loop will not be affected by the mode in which the engine is running.

When the engine is running in the first mode, the first ECU will function as intended by the OEM since the engine will be fuelled entirely by the first fuel. This is because the second ECU does not modify either the first input signals or the first output signal when the engine is running in the first mode. However, when the engine is running in the second mode, the first modified signal will cause a reduced amount of first fuel flowing into the engine when compared to the amount of first fuel flowing into the engine when the engine is running in the first mode under the same conditions. The first ECU will, however, still receive a returned un-modified signal, and therefore believe it is working correctly. This means no engine fault will be indicated on a diagnostic system forming part of the engine assembly.

In addition, when the engine is running in the second mode the second calculated signal causes a predetermined amount of second fuel to flow into the engine in order to augment the amount of first fuel injected into the engine by the first injectors.

Preferably, the first engine control unit (ECU) is a master unit and the second ECU is a slave unit controlled by the first ECU.

Preferably the first ECU is adapted to control the timing of flow of first fuel into the engine when the engine is operating in the first mode, and the second ECU is adapted to control the timing of flow of both the first fuel and the second fuel when the engine is operating in the second mode.

The timing of flow of both the first fuel and the second fuel in either mode will be controlled to occur at a particular time in the cycle of the engine. Depending on the type of fuel used for both the first fuel and the second fuel, the timing of flow of the second fuel into the engine may be different to the timing of flow of the first fuel into the engine when the engine is running in the second mode.

Preferably, the first fuel comprises diesel and the second fuel comprises natural gas (methane).

The first ECU is therefore a diesel ECU and is adapted to control the flow of diesel into the engine when the engine is operating in the first mode.

Preferably, the engine comprises a plurality of first injectors for injecting the first fuel into the engine and a plurality of second injectors for injecting the second fuel into the engine, the output of the first ECU being adapted to emit a plurality of first output signals, each of which output signals is adapted to control a different one of the first injectors, the second ECU being adapted to modify each of the plurality of first output signals to produce a plurality of first modified signals and a plurality of second calculated signals when the engine is operating in the second mode, each of the plurality of first modified signals being adapted to control a different one of the first injectors when the engine is operating in the second mode.

The plurality of first modified signals and second calculated signals produced by the second ECU determine not only the amount of fuel injected by a respective injector, but also the timing of injection of the fuel.

The first modified signals result in the first fuel being injected into the engine in smaller quantities than would be the case if the engine were running in the first mode.

The second calculated signals are transmitted to the second injectors and cause the second fuel to be injected into the engine in order to augment the lower amount of first fuel that has been injected into the engine.

The first ECU is thus adapted to control the amount and timing of, a first fuel injected into the engine in a known manner when the engine is running in the first mode. In addition, the second ECU is adapted to control the amount, and timing of injection of both the first fuel and the second fuel into the engine when the engine is running in the second mode.

Preferably, the engine is either a unit injector or a common rail diesel engine. The second ECU functions under the control of the original equipment mapping strategy when part of the first ECU. The duration of injection of the first fuel by the first injectors and the second fuel by the second injectors, and the timing of these injections are preferably modified via pulse width modulation (PWM) control. This means that the timing and amount of fuel injected into the engine either by the first injectors or the second injectors is determined by the pulse width of the first modified signals, and second calculated signals respectively.

By means of the present invention therefore conversion of existing unit injection or common rail diesel engine assemblies is facilitated. The second ECU effectively splits the original injection time of injection of the first fuel into the engine into a dual process in which diesel is injected by the first injectors on a compression stroke of the engine. When the engine is running in the second mode, the diesel will act as a pilot ignition source for the second fuel which second fuel is injected into the engine by means of metered induction by charge sequential indirect port injection on the induction stroke of the engine triggered by the firing order of the diesel injectors.

Advantageously, the second ECU further comprises a calculator for calculating the calorific content of a first amount of first fuel that would be supplied to the engine if the engine were running in the first mode, and the calorific content of a second amount of first fuel supplied to the engine when the engine is running in the second mode, a comparator for comparing the difference between the calorific content of the first amount of first fuel and the calorific content of the second amount of first fuel, the calculator being further adapted to calculate a required amount of second fuel to be supplied to the engine when the engine is running in the second mode in order to ensure that the overall calorific content of the second amount of first fuel and the amount of second fuel is substantially the same as the calorific content of the first amount of first fuel.

In embodiments of the invention in which the engine system comprises a plurality of first injectors and a plurality of second injectors, the calculator is adapted to calculate the calorific content of a first amount of first fuel that would be injected into the engine by a first injector if the engine were running in the first mode, and the calorific content of a second amount of first fuel to be injected into the engine when the engine is running in the second mode and to calculate a required amount of second fuel to be injected into the engine when the engine is running in the second mode.

The second ECU may thus continually calculate the required amount of second fuel to be injected into the engine to augment the first fuel that is supplied by each first injector into the engine. The calculation may thus continually take into account changes in the energy requirement of the engine due to changes in the variables measured by the first sensors.

In other words, when the engine is running in the first mode, the first ECU will calculate a required amount of first fuel to be injected into the engine dependent on the values of the variables measured by the first sensors. The amount to be injected into the engine when the engine is running in the first mode is likely to change as the engine is running, since the variables measured by the first sensors are likely to change.

When the engine is running in the second mode, the second ECU will calculate from the first output signals the amount of first fuel that would be injected into the engine if the engine were running in the first mode. The second ECU will then modify the first output signals to produce the first modified signals which will cause a reduced amount of first fuel to be injected into the engine when compared to the amount of first fuel that would have been injected into the engine had the engine been run entirely on the first fuel as would be case if the engine were running in the first mode. The second ECU will then calculate the shortfall of energy that will be supplied to the engine by the reduced amount of first fuel. The second ECU will then calculate the amount of second fuel that must be injected into the engine to supply the shortfall of energy to the engine in order that the engine receives the required amount of energy.

Advantageously, the second ECU comprises a signal returner for returning the first output signals to the first ECU in an unmodified form when the engine is running in either the first mode or the second mode.

This means that the first ECU will receive what appears to be a confirmation signal from the second ECU indicating that that the engine is running as expected (i.e., as if it were running in the first mode) whether or not the engine is running in the first or the second mode.

Advantageously, the engine system comprises a plurality of second sensors operatively connected to the second ECU. These are necessary to measure the temperature and pressure of the second fuel in order to accurately calculate the calorific value of the second fuel, and therefore achieve the correct energy replacement for the reduced diesel injection. The second fuel system is independent of the OEM system, and so has to be catered for separately. Separate intake manifold pressure sensor and engine temperature sensors can also be used instead of the OEM diesel sensors to avoid possible electronic signal conflict.

Preferably, each of the second sensors transmits a second output signal to the second ECU which output signal is dependent on a measured second variable.

The second sensors measure variables such as manifold pressure, coolant temperature, gas pressure and gas temperature. Depending on the values of each of these variables, the second ECU will calculate from the first input signals from the first ECU to take into the account the values of these variables.

Advantageously, the engine system further comprises a $\lambda$ sensor located in the exhaust system of the engine, which $\lambda$ sensor is operatively connected to the second ECU within a closed loop. Preferably the $\lambda$ sensor comprises a wide band oxygen sensor.

The $\lambda$ sensor measures the amount of unburned oxygen in exhaust gases emitted from the engine and transmits signals to the second ECU representative of this amount.

The second ECU is adapted to modify either the first modified signals, or the second calculated signals, or both, in response to the $\lambda$ sensor signals to adjust the ratio of first and second fuels to air, i.e. the air to fuel ratio, flowing into the engine to ensure efficient combustion of the first and second fuels.

Preferably, the engine system comprises a trigger for triggering the engine to switch from the first mode to the second mode.

Conveniently, the engine system will be programmed to operate in the first mode whenever the engine is initially started. The engine system will then switch to the second mode in response to one or more parameters reaching a predetermined level.

Advantageously, the engine system further comprises a second trigger for triggering the engine system to switch from the second mode to the first mode.

Advantageously, the engine system will switch from the second mode to the first mode in response to one or more parameters rising above or falling below a predetermined level.

Advantageously, the engine system further comprises a manual override trigger for causing the engine system to switch from either the first mode to the second mode or vice versa when required by an operator of the engine system.

When the engine system is running in the first mode the second ECU is only partially active, i.e. is in hibernation, and simply transmits the first output signals unmodified to the first injectors. In this first mode the gas injectors are switched off. If there is no hibernation, the second ECU is fully active, and the engine will run in the second mode.

Preferably, when the engine is running in the second mode, the first output signal or signals emitted by the first ECU in order to control the flow/injection of the first fuel will be compared to a predetermined maximum output signal. If the pulse length of the first output signal is greater than the pulse length of the predetermined limit output signal, the second ECU will compute an appropriate second signal or signals for causing appropriate injection of the second fuel. The first modified signal(s) may have the length of the predetermined limit programmed into a map in the second ECU. The length of the first modified signal(s) may also be calculated by the second ECU according to a predetermined algorithm. The second signals will have a length that is calculated from the difference between the first signal and first modified signal, multiplied by the difference in energy values between the two fuels, according to information received from the second sensors and wide band oxygen sensor ($\lambda$ sensor).

According to a second aspect of the present invention there is provided a second ECU forming part of a multi-mode engine system according to the first aspect of the present invention.

In some embodiments it would be advantageous to reduce the pressure of the diesel that is injected, as well as the signal duration length, as this would reduce the fuel volume and therefore calorific value. In such embodiments, the second ECU would take into account the pressure reduction and the signal duration reduction in its calculation of energy requirement. In practice this would mean the addition of a diesel pressure sensor and a valve controlled by the second ECU that would limit the pressure according to engine parameters. The diesel pressure sensor and control valve would be connected only to the second ECU, and would only operate in dual fuel mode, full fuel pressure being available in diesel mode.

According to a third aspect of the present invention there is provided a method for operating an engine in either a first mode in which the engine is fuelled by a first fuel, or in a second mode in which the engine is fuelled by a second fuel, or by a mixture of the first fuel and the second fuel, the method comprising the steps of:

programming the engine to operate initially in the first mode repeatedly sensing a plurality of variables and obtaining a measured value for each sensed first variable, emitting a first input signal dependent on the measured value of each sensed first variable;

causing a first output signal to be emitted in dependence on the first input signals for controlling the amount of the first fuel supplied to the engine, switching the mode of operation to the second mode;

modifying the first output signal to produce a first modified signal and a second calculated signal, the first modified signal determining the amount of first fuel supplied to the engine and the second calculated signal determining the amount of second fuel supplied to the engine when the engine is running in the second mode.

Advantageously, the method comprises the additional steps of controlling the timing of flow of both the first fuel and the second fuel into the engine when the engine is running in the second mode, in dependence on the first output signal.

Preferably, the first fuel comprises diesel, the second fuel comprises methane and the first ECU comprises a diesel ECU.

Advantageously, the engine comprises a plurality of first injectors for injecting the first fuel into the engine and a plurality of second injectors for injecting the second fuel into the engine, and the step of causing a first output signal to be emitted in dependence of the first input signals comprises the step of causing a plurality of first output signals to be emitted in dependence on the first input signals, the method comprising the further step of controlling each of the first injectors in dependence on a first output signal, and the step of modifying the first output signal to produce a first modified signal and a second calculated signal comprises the step of modifying the first output signals to produce a plurality of first modified signals and a plurality of second calculated signals, each of which first modified signals controls one of the first injectors, and each of which second calculated signals controls one of the second injectors, when the engine is operating in the second mode.

Preferably, the method comprises the further step of calculating the calorific content of a first amount of first fuel that would be supplied to the engine if the engine were running in the first mode, calculating the calorific content of a second amount of first fuel supplied to the engine when the engine is running in the second mode;

comparing the calorific content of the first amount of first fuel and the calorific content of the second amount of first fuel to calculate an energy deficit;

calculating a required amount of second fuel to be supplied to the engine when the engine is running in the second mode in order to compensate for the energy deficit.

Preferably, the engine comprises a first engine control unit (ECU), and a second ECU comprising a slave unit operatively connected to the first ECU, and the first output signal or signals are emitted by the first ECU, the method comprising the further step of returning a signal to the first ECU in an unmodified form corresponding to each of the first input signals.

Conveniently, the method comprises the further step of returning a signal to the first ECU in an unmodified form when the engine is running in either the first mode or the second mode.

Advantageously, the method comprises the further step of measuring the oxygen content in exhaust gases exhausted from the engine, and further modifying either the first modified signals or the second calculated signals or both the first modified signals and second calculated signals depending on the measured oxygen content.

Conveniently, the method comprises the further steps of repeatedly sensing a plurality of second variables and obtaining a measured value for each sensed second variable, and emitting a second input signal dependent on the measured value of each sensed second variable.

The second input signals may be analysed together with the first input signals, to produce first modified signals and second calculated signals which will control the first and second injectors respectively to inject appropriate volumes of first and second fuel into the engine at appropriate time.

DETAILED DESCRIPTION OF THE INVENTION

Figure 1:
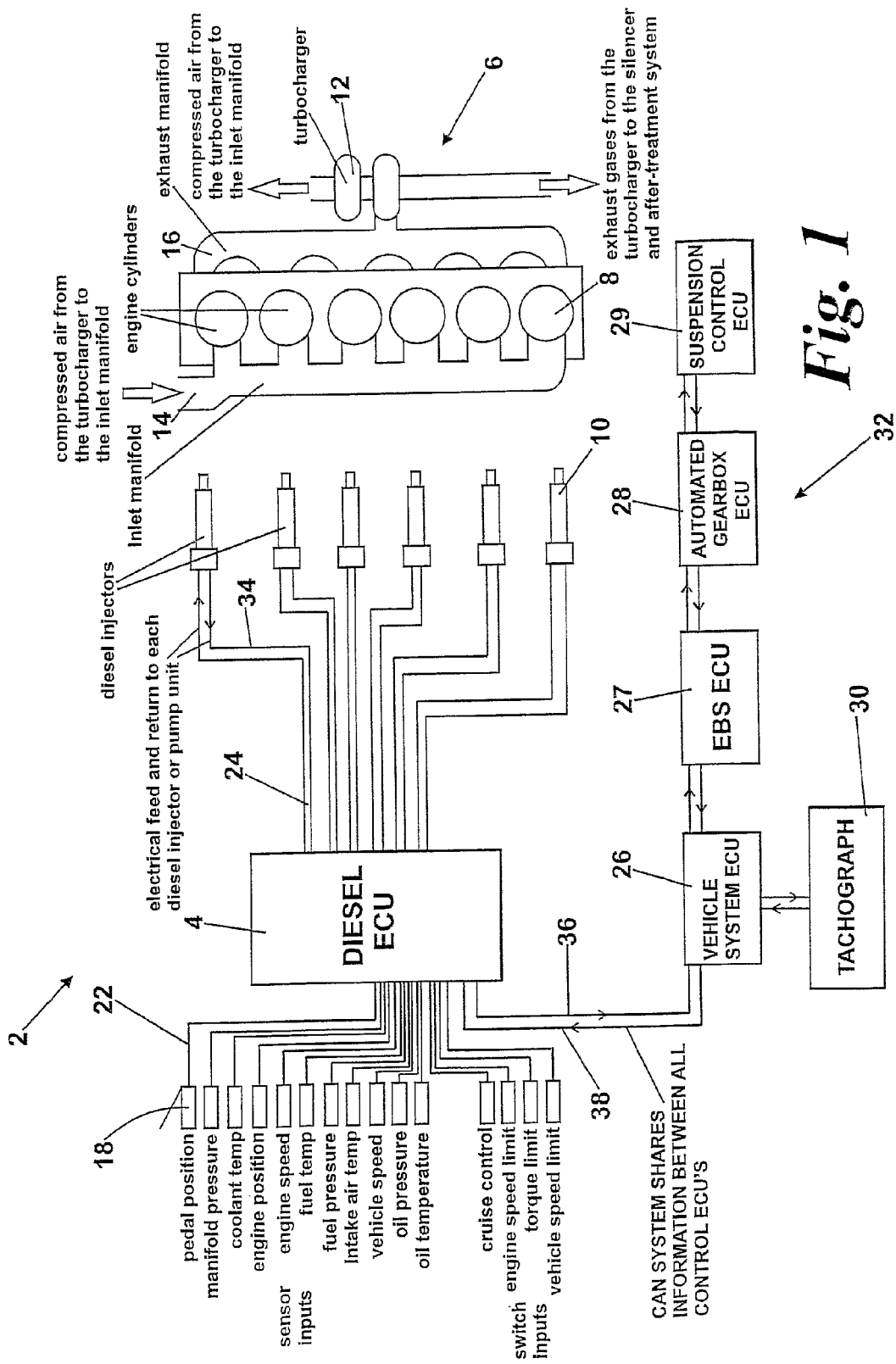
FIG. 1 is a schematic representation of a diesel ECU forming part of a known engine designed to be fuelled by diesel only.

Referring to FIG. 1, a known diesel engine assembly is designated by the reference numeral 2. The engine assembly comprises a diesel control unit (ECU) 4 controlling engine 6. The ECU 4 is designed by an Original Equipment Manufacturer to enable the engine 6 to run on diesel as efficiently as possible taking into account various parameters that could affect the power requirements and fuel requirements of the engine 6. The engine may be of any suitable kind, but in this example, the engine is a common rail injector engine comprising six cylinders 8, and six diesel injectors 10. The engine 6 further comprises an inlet manifold 14 and an exhaust manifold 16.

The engine 6 in this example further comprises a turbo charger 12 for enhancing the performance of the engine in a known manner. During operation of the engine 6, compressed air from the turbo charger 12 is drawn into the engine via an inlet manifold 14 into the cylinders 8. The injectors 10 each inject diesel into the cylinders. The amount of fuel injected into the engine by each injector 10, and the timing of injection of the fuel by each injector is controlled by the ECU 4. The diesel mixes with the air in a known manner and explodes during the compression cycle of the engine 6, in order to provide power to power the engine 6. After compression, exhaust gases enter exhaust manifold 16, which gases contain a mixture of fuel and air. The exhaust gases are directed by the exhaust manifold 16 to a silencer and after-treatment system (not shown).

The diesel ECU 4 controls operation of a plurality of first sensors 18 which are operatively connected to the ECU 4. The first sensors each sense a particular variable parameter such as: pedal position; manifold pressure; coolant temperature; engine position; engine speed; fuel temperature; fuel pressure; intake air temperature; vehicle speed; oil pressure; oil temperature etc.

The diesel ECU 4 is also operatively connected to a plurality of switches 20 which control parameters such as cruise speed; engine speed; torque and vehicle speed limit. These switches also transmit signals to the diesel ECU 4 dependent on a limit set for a particular variable.

The diesel ECU 4 thus comprises a master unit and each of the sensors 18, switches 20 and injectors 10 are slave units controlled by the master ECU 4.

The diesel ECU 4 comprises a signal receiver (not shown) for receiving first input signals 22 from the first sensors 18 and switches 20. The value of each first input signal 22 is dependent on the variable being sensed. In this example, the first input signals 22 are either pulse width modulated or analogue, and the width of the pulse or level of voltage is dependent on the value of the variable being sensed. The diesel ECU 4 will receive the input signal 22 and will transmit a first output signal 24 to each of the injectors 10 dependent on the value of each of the variables sensed. Each first output signal 24 determines the amount of diesel injected into the engine 6 and also the time relative to the cycle of the engine at which the diesel is injected into the engine.

The Original Equipment Manufacturer develops an engine map which is a three-dimensional data array which enables the diesel ECU 4 to determine appropriate amounts of diesel to be injected into the engine and the timing of such injection, depending on all parameters measured. This ensures that the engine runs as efficiently as possible given the prevailing conditions.

The diesel ECU also has a control input to other electrical components in the engine assembly 2. In this example, the engine assembly further comprises a vehicle system ECU 26, and electronic brake system ECU 27, an automated gear box ECU 28, a suspension control unit 29, and a tachograph 30. Each of these components is operatively connected to the diesel ECU 4 by means of a bus system 32 which in this example comprises a CAN loop as described hereinabove. The units 26-30 are also electronic control units operatively connected to the diesel ECU 4.

The diesel ECU 4 will have an input to and receive an input from the units 26 to 30 in response to the first input signals 22 transmitted to the diesel ECU 4 by the sensors 18 and switches 20.

In order to control the timing and amount of diesel injected into the engine 6, the diesel ECU 4 transmits a plurality of first output signals 24 to the injectors 10, each injector receiving one of the plurality of first output signals 24. Each of the injectors 10 transmits a return signal 34 to the diesel ECU 4 once it has received a first output signal. This confirms to the diesel ECU 4 that the injector 10 is operating correctly.

Similarly, the diesel ECU 4 has an input to the operation of the components 26-30 by transmitting a bus signal 36 which is transmitted via the CAN loop bus system 32. Each of the units 26 to 30 is adapted to return a return signal 38 to the diesel ECU confirming that the system is operating correctly, and also requesting changes to the power of the engine according to system requirements, such as if the electronic braking system senses a road wheel spinning out of synchronisation with the others, it can request a power reduction to prevent the wheel from spinning.

Figure 2:
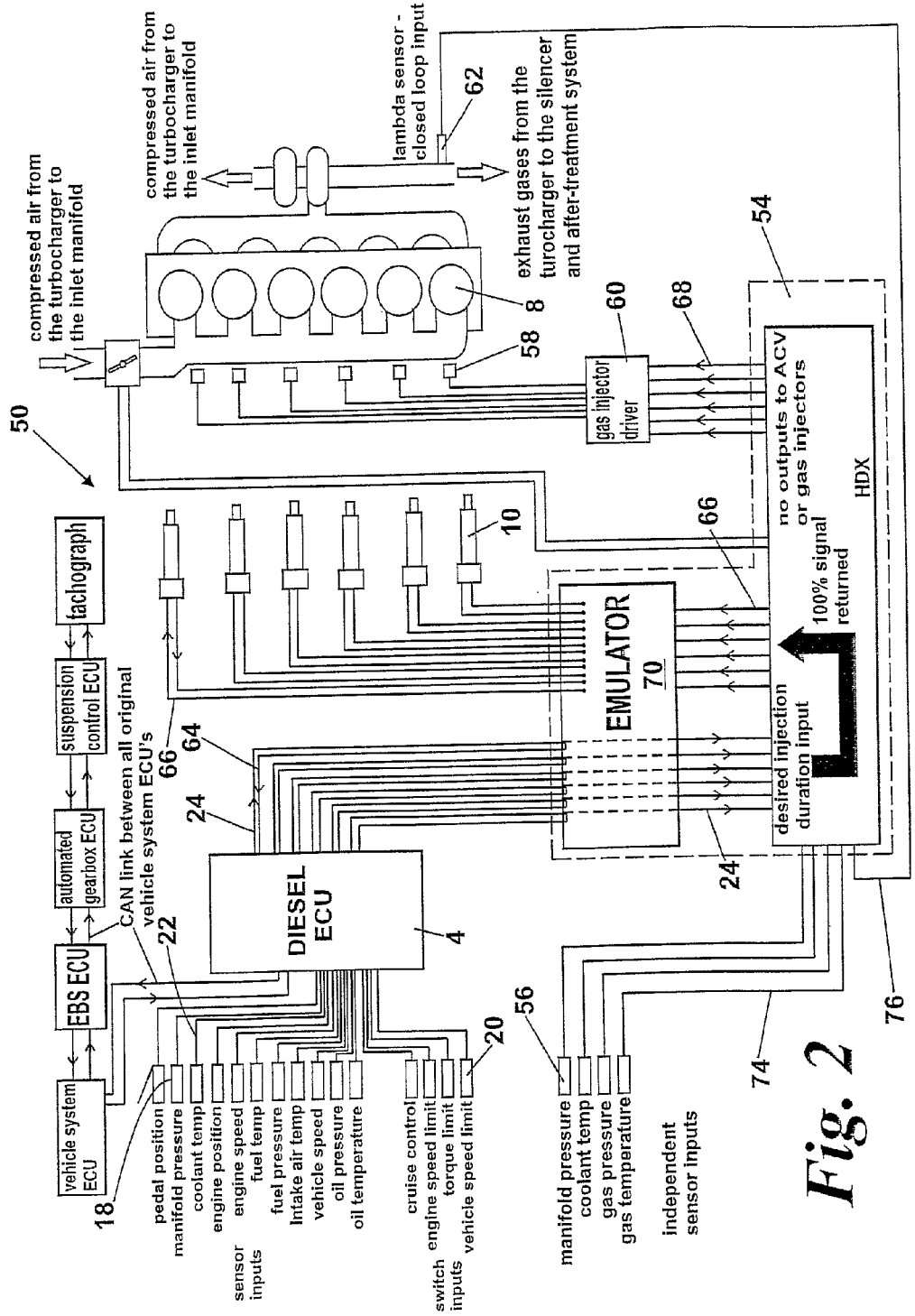
FIG. 2 is a schematic representation of an engine assembly according to an embodiment of the invention showing operation in a first mode.
Figure 3:
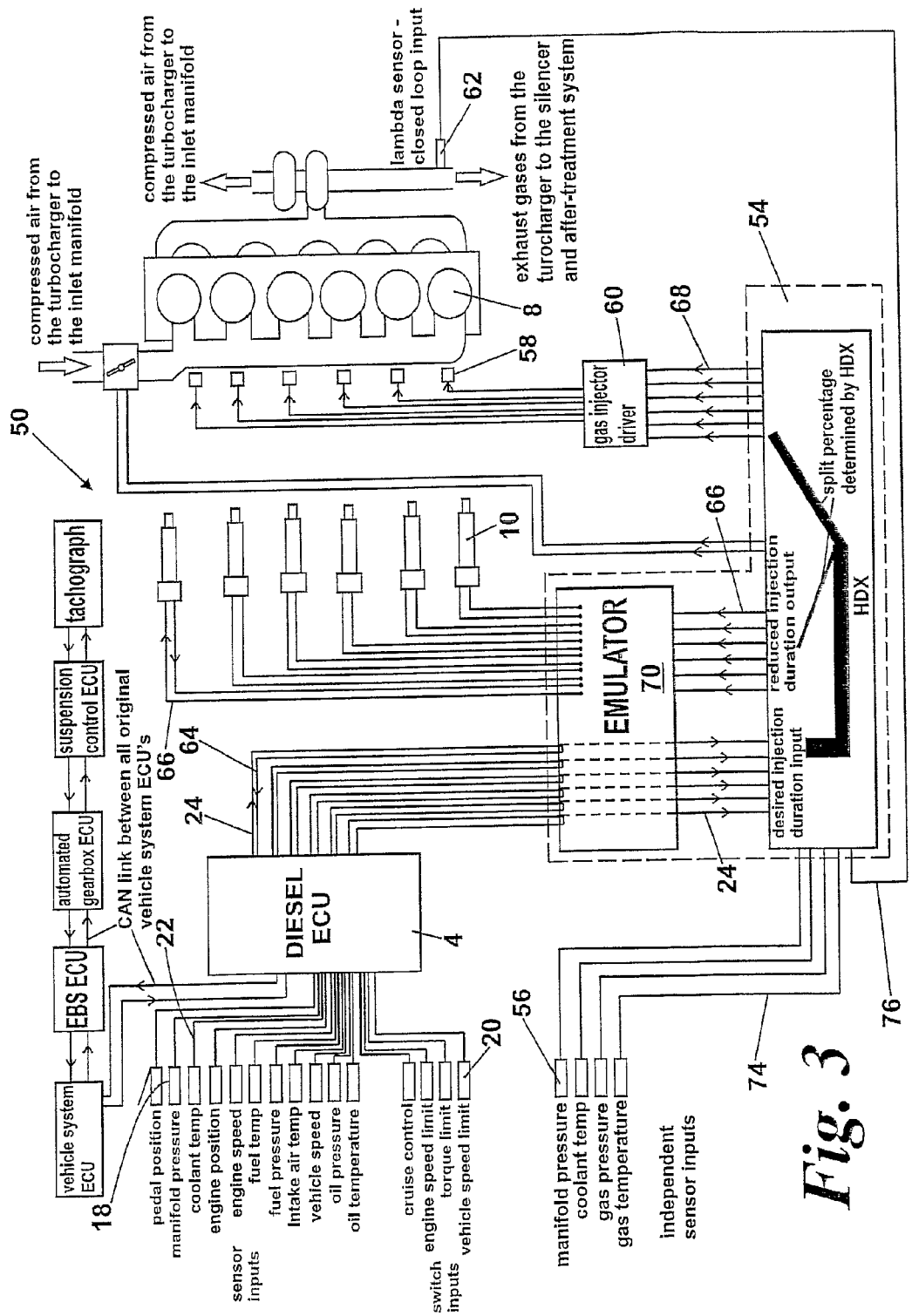
FIG. 3 is a schematic representation of the engine assembly of FIG. 2 operating in a second mode.

Turning now to FIGS. 2 and 3, an engine assembly according to a first embodiment of the invention is designated generally by the reference numeral 50. The engine assembly comprises components of the known engine assembly 2 illustrated in FIG. 1 and described hereinabove which components have been given corresponding reference numerals for ease of reference.

The engine assembly 50 comprises a first ECU in the form of diesel ECU 4 illustrated in FIG. 1, operatively connected to a plurality of first sensors 18 and switches 20. The diesel ECU 4 is further operatively connected to a plurality of diesel injectors 10 which are adapted to inject diesel into engine 6 under the control of the diesel ECU 4. The diesel ECU 4 is also adapted to have an input to further units within the engine assembly 26-30 by means of CAN bus system 32, as described herein above with reference to FIG. 1.

The engine assembly 50 further comprises a second ECU 54 which is operatively connected to, and has a controlling input from diesel ECU 4. Operatively connected to the second ECU 54 is a plurality of second sensors 56 which, in this embodiment, are adapted to measure: manifold pressure; coolant temperature; gas pressure and gas temperature. The engine system 50 further comprises a plurality of gas injectors 58, and a gas injector driver 60 both of which are operatively connected to the second ECU 54.

The engine system 50 further comprises a λ sensor 62 which is operatively connected to the second ECU 54 so as to form a closed loop input. The λ sensor 62 is a broad band oxygen sensor adapted to measure the oxygen content in the engine exhaust gases.

The second ECU 54 enables the engine assembly 50 to operate either in a first, diesel, mode or in a second mode in which the engine is fuelled by methane and diesel.

FIG. 2 shows the engine system 50 configured to operate in the first mode, and FIG. 3 shows the engine assembly 50 configured to operate in the second mode.

The engine assembly 50 will further comprise a trigger (not shown in FIG. 2 or 3) which will trigger the engine to switch from operating in the first mode to operating in the second mode. This will be described herein below in more detail with reference to FIG. 4.

When the engine assembly 50 is operating in the first mode the dual fuel feature of the engine is described as being in hibernation. Effectively, this means that the second ECU 54 has no effect on the operation of the engine assembly 50 as will also be described in more detail herein below.

Referring initially to FIG. 2, the engine system 50 is shown in the configuration which enables it to run in the first mode. When running in the first mode, the engine assembly 50 runs in a similar manner to the engine assembly 2 illustrated in FIG. 1 and described hereinabove.

The second ECU 54 is adapted to receive the first output signals 24 emitted by the diesel ECU 4 before those signals have been received by the diesel injectors 10.

When the engine system 50 is to run in the first mode, and the second ECU 54 is in hibernation, the first output signals 24 will be transmitted unmodified to the injectors 10 as they would in engine assembly 2. In addition, the second ECU 54 will transmit a return signal 64 to the diesel ECU 4 for each of the first output signals 24 emitted by the diesel ECU 4. This will inform the diesel ECU 4 that the diesel injectors are running correctly.

When the engine system 50 is to run in the second mode, i.e., on a mixture of methane and diesel, as shown in FIG. 3, the engine system 50 triggers the ECU 54 to operate in the second mode. The second ECU 54 will then modify the first output signal 24 from the diesel ECU 4 to produce first modified signals 66, and second calculated signals 68. The way in which the modified signals 66, 68 are produced will now be described in more detail. The first modified signals 66 are transmitted to the diesel injectors 10 and control injection of diesel into the engine 6. The second calculated signals are transmitted to the gas injector driver 60 which in turn uses these signals to control injection of methane into the engine 6 via the gas injectors 58. In the embodiment shown the gas injector driver 60 is separate from the second ECU 54. In other embodiments (not shown) the gas injector driver 60 may for an integral part of the second ECU 54.

The second ECU 54 comprises an emulator 70 which receives the first output signals 24 from the diesel ECU 4. In the embodiment shown the emulator 70 is an integral part of the second ECU 54. In other embodiments (not shown) the emulator 70 may be separate from the second ECU 54.

The emulator 70 will transmit a return signal 64 to the diesel ECU 4 corresponding to each of the first input signals 24 received from the diesel ECU 4. The return signals 64 will indicate to the diesel ECU that the engine is running as it would in the first mode. Thus from the point of view of the diesel ECU 4, the engine is running as normal, and the diesel ECU 4 communicates with components 22, 24, 26, 28 and 30 as it would do if the engine were running in the first mode.

The second ECU 54, on receiving the first output signals calculates the intended duration of diesel injection input that would be required to operate the engine 6 in the first mode based on the first output signals 24. The second ECU 54 then modifies the first output signals 24 by reducing the pulse width of the signals to produce the first modified signals 66. First modified signals 66 of reduced pulse width are then transmitted to the diesel injectors 10 by the emulator 70. This means that the amount of diesel injected into the engine 6 will be reduced compared to the amount that would have been injected into the engine 6 had the engine been running entirely on diesel.

The second ECU then calculates the reduction in energy that will be supplied to the engine 6 by the reduced amount of diesel injected by the injectors 10. The second ECU then calculates the amount of methane that will have to be additionally injected into the engine 6 in order to ensure that the engine 6 receives substantially the same amount energy from both the diesel and the gas injected into the engine as would be the case if the engine were running in the first mode entirely on diesel.

The λ sensor (lambda sensor) 62 measures the amount of unburned oxygen in exhaust gases of the engine and transmits a signal 76 to the second ECU 54 which signal is dependent on the measured oxygen content.

Before producing the second modified signals 68 for transmission to the gas injector driver 60 which will drive the gas injectors 58, the second ECU 54 takes into account other variables.

One such variable is the oxygen content in exhaust gases measured by the λ sensor (lambda sensor) 62. It is not usual for OEMs to include a lambda sensor as part of the diesel engine control system, but it is considered necessary for a dual fuel engine.

Because the λ sensor 62 is connected to the second ECU by a closed loop, the second ECU 54 may continuously monitor the exhaust gas oxygen content and adjust the relative amounts of diesel and gas injected into the engine 6 to help ensure efficient running of the engine 6. The second ECU 54 may also control an air control valve to vary the amount of air entering the engine and hence the air to fuel ratio of the air/fuel mixture entering the engine, and so further ensure efficient combustion of the diesel and gas fuels. The gas will be injected at a different point in the engine cycle to the diesel.

The second ECU 54 is also operatively connected to second sensors 56 which also transmit signals dependent on other engine parameters.

Each of the second sensors 56 emits a second input signal 74 which is received by the second ECU 54. The second input signals 74 are dependent on each of the variables measured by each of the second sensors 56.

The second ECU therefore takes into account the first input signals 24, the second input signals 74 and signal 76 from the λ sensor 62 when calculating the length of the first modified signals 66 and second calculated signals 68. The second calculated signals 68 are transmitted by the second ECU 54 to the gas injector driver 60 which controls each of the gas injectors 58 in accordance with the instructions received via the second calculated signals 68.

By means of the present invention it is possible to retro fit the second ECU 54, the gas injector driver 60, λ sensor 62 and second sensors 56 to an existing engine assembly 2 adapted to be fuelled by diesel only in order to produce an engine assembly 50 according to the present invention which is able to operate in a first mode in which it is fuelled by diesel, and a second mode in which is it fuelled by methane or a mixture of diesel and methane.

Figure 4:
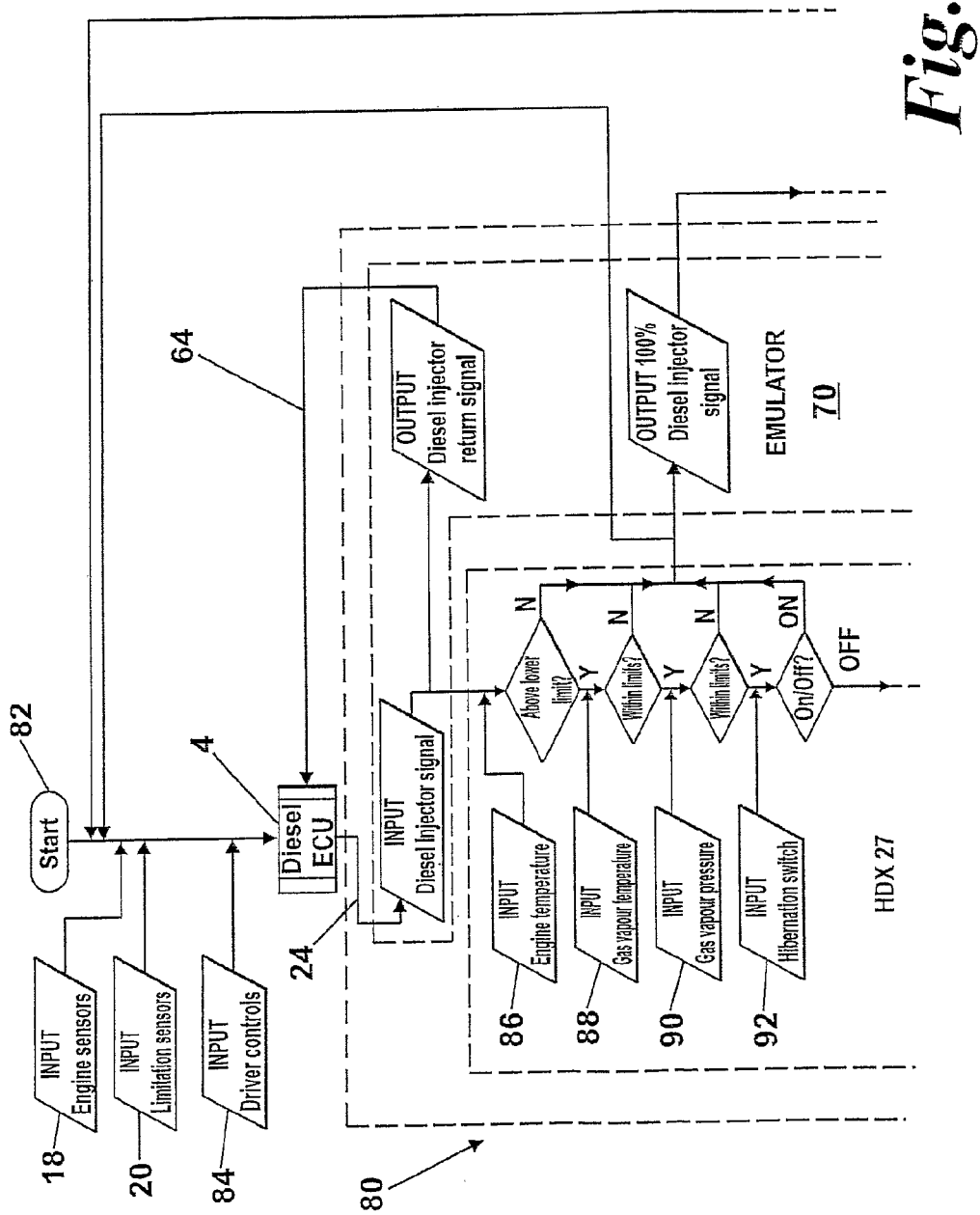
FIG. 4 is a flow chart showing operation of the engine assembly of FIGS. 2 and 3.
Figure 4:
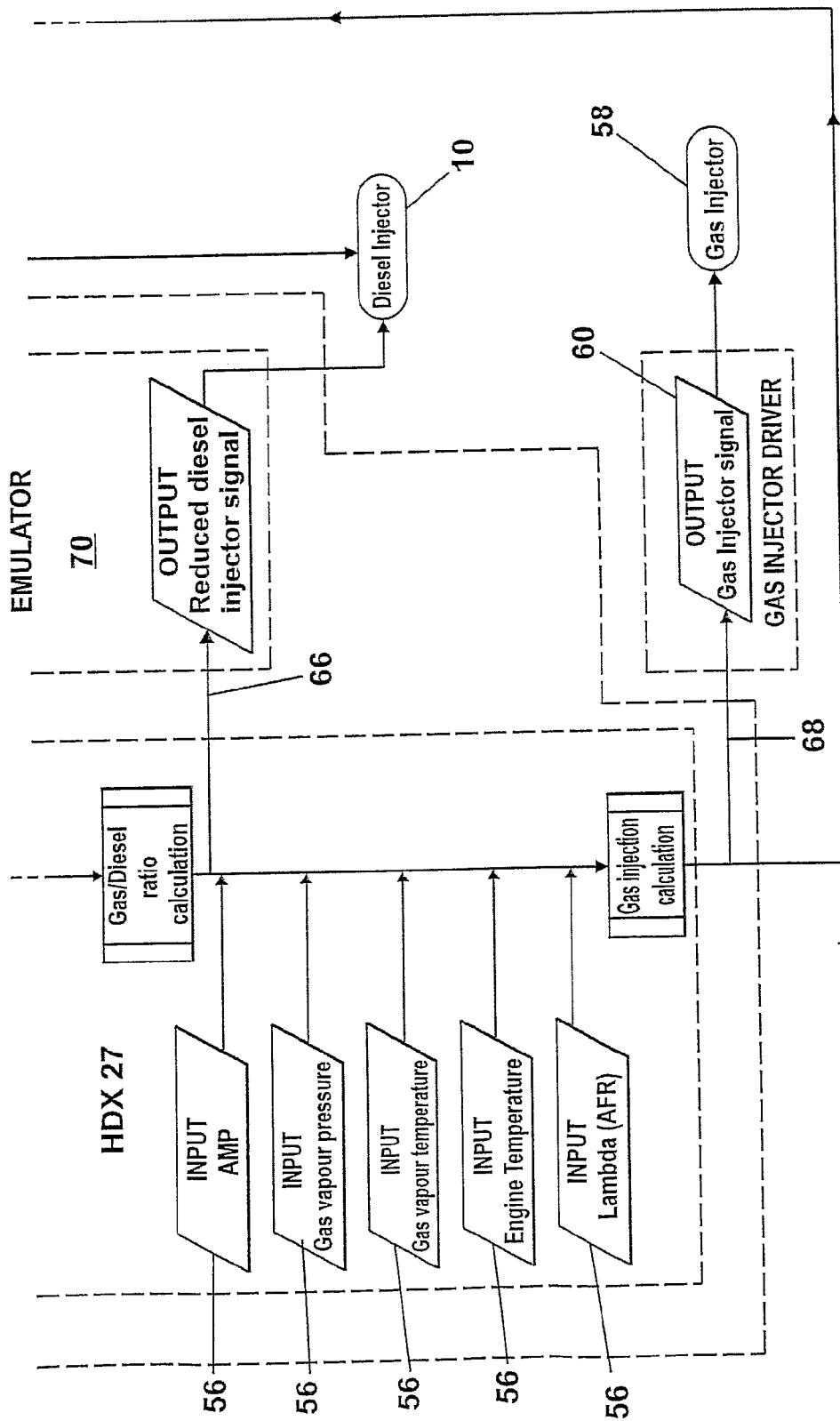

Turning now to FIG. 4, the operation of the engine will be described with reference to a flow chart 80.

Parts of the engine assembly 50 that correspond to the engine system described with reference to FIGS. 2 and 3 have been given corresponding reference numerals for ease of reference.

When the engine is initially started at start 82, the diesel ECU will cause the engine to operate in the first mode in which it is fuelled entirely by diesel.

In order to ensure that the engine 6 is running as efficiently as possible, the diesel ECU receives first input signals 22 from first sensors 18, switches 20, and driver controls 84. The diesel ECU then transmits a plurality of first output signals 24 to the diesel injectors 10, based on the input signals 22 received from the first sensors 18, switches 20, and driver controls 84.

The engine thus operates in the first mode, and the second ECU 54 is effectively in hibernation. As the engine continues to be operated, the second ECU 54 will monitor certain parameters such as engine temperature 86, gas vapour temperature 88, gas vapour pressure 90 and a manual hibernation switch 92. Each of these sensors together with switch 92 is operatively connected to the second ECU 54. In this example, the second ECU will monitor whether the engine temperature is above or below a predetermined lower limit. If the engine temperature is below the predetermined lower limit the second ECU 54 will remain in hibernation and the engine will continue to run in the first mode.

If the engine temperature is above the predetermined lower limit the second ECU 54 will then determine whether the gas vapour pressure is within a predetermined limit. If the gas temperature is not within predetermined limits the engine will continue to run in the first mode.

If the gas vapour temperature is within the predetermined limits, the second ECU 54 will determine whether the gas vapour pressure is within predetermined limits. If the gas vapour pressure is not within predetermined limits, the engine will continue to run in the first mode.

If the gas vapour pressure is within predetermined limits the second ECU 54 will determine whether the manual hibernation switch 92 is switched on or off. If it is on, then despite the fact that the variables measured by sensors 86, 88 and 90 are within predetermined limits or in the case of the engine temperature above a predetermined lower limit, the engine will continue to run in the first mode. If however the hibernation switch 92 is off then the engine system will be triggered to run in the second mode. In this case the second ECU will carry out an energy calculation to calculate the required ratio of gas/diesel that must injected into the engine in order to ensure that the engine has appropriate energy input as described hereinabove. This will result in first modified signals 66 being produced by the second ECU 54. The first modified signals 66 control diesel injectors 10.

The second ECU will also receive signals from second sensors 56 which in this embodiment measure the absolute manifold pressure, gas vapour pressure, gas vapour temperature, engine temperature and air to fuel ratio. The measured variables measured by second sensors 56 will result in the second ECU 54 calculating the amount of gas that should be injected into the engine by the gas injectors 58, and producing the second calculated signals 68 which are emitted to the gas injector driver 60 which in turn drives the gas injectors 58.

Figure 5:
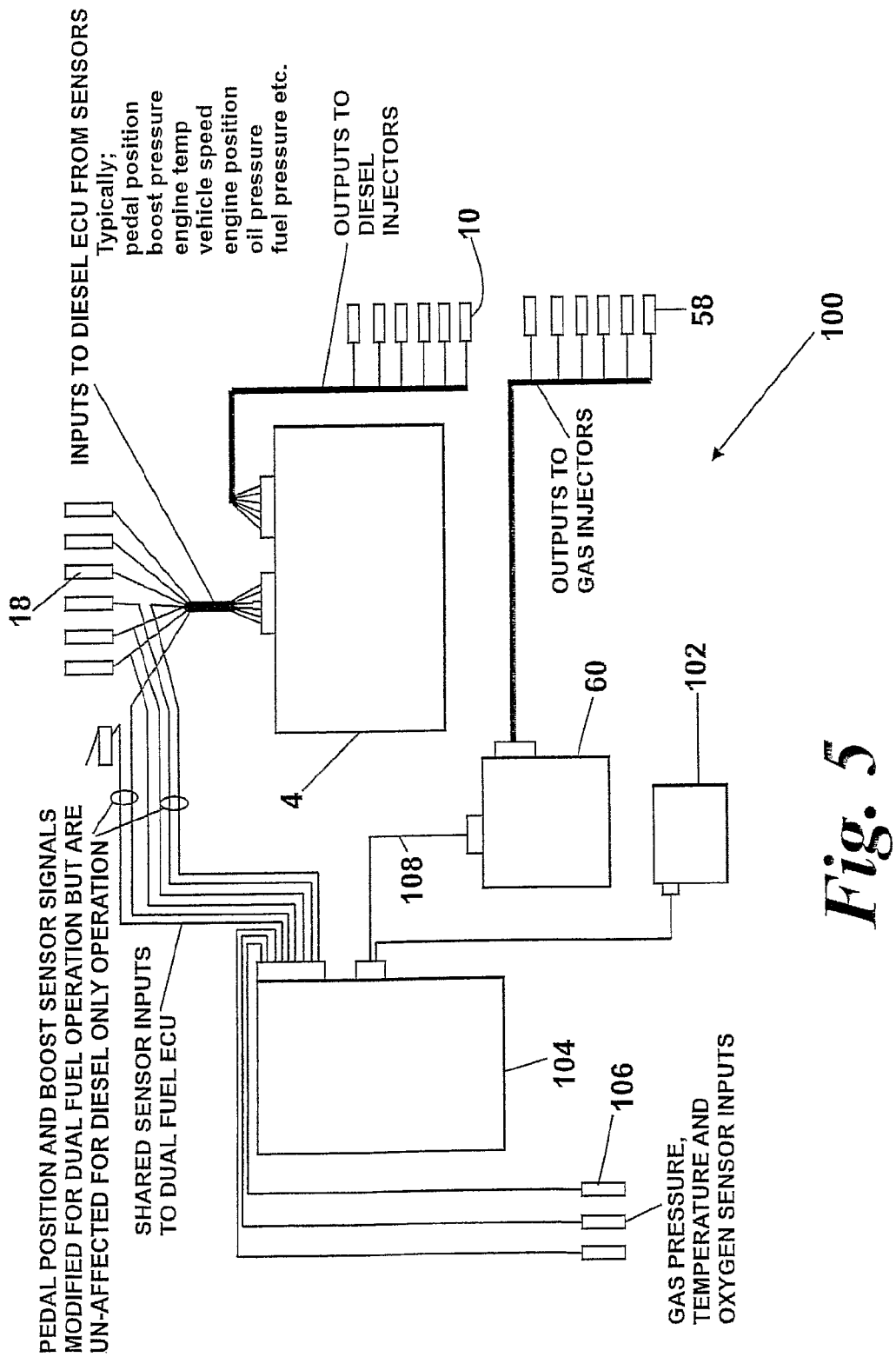
FIG. 5 is a schematic representation of a further engine system.

Referring to FIG. 5 a further engine assembly is designated generally by the reference numeral 100. Parts of the engine system which correspond to parts of the engine system illustrated in FIGS. 2 and 3 have been given corresponding reference numerals for ease of reference.

The engine system 100 comprises a diesel ECU 4, diesel injectors 10, a gas injector driver 60, gas injectors 58 and air control valve 102. The diesel ECU 4 controls operation of the diesel injectors 10 as described hereinabove with reference to FIGS. 2 and 3.

The engine assembly 100 further comprises a second ECU 104. The engine assembly further comprises first sensors 18 which are operatively connected to the diesel ECU 4 and second sensors 106 which are operatively connected to the second ECU 104.

In this arrangement, the second ECU 104 intercepts the first input signals 22 emitted by the first sensors 18 before they have been received by the first diesel ECU 4.

The second ECU then modifies the signals before returning modified signals to the diesel ECU 4. The diesel ECU 4 will then control operation of the diesel injectors 10 according to the modified signals.

In addition, the second ECU 104 emits output signals 108 which cause the gas injector driver 60 to control injection of gas into the engine by the gas injectors 58 when the engine is running in the second mode. The second ECU also takes into account signals received from the second sensors 106 in a similar manner to that described hereinabove with reference to FIGS. 2 and 3.

The engine system 100 differs from the engine system illustrated in FIGS. 2 and 3 in that the second ECU intercepts signals from the first sensors before these signals have been received by the first ECU. Modified signals are then transmitted to the first ECU which modified signals result in a modified amount of first diesel being supplied to the engine.

The invention claimed is:

1. A multi-mode engine system comprising an engine adapted to operate in a plurality of different modes including a first mode in which the engine is fuelled substantially entirely by a first fuel, and a second mode in which the engine is fuelled substantially entirely by a second fuel, or by a mixture of the first and second fuels, the engine comprising:
a first engine control unit (ECU) for controlling the flow of the first fuel into the engine when the engine is operating in the first mode;
a plurality of first sensors operatively connected to the first ECU, each of which first sensors is adapted to sense a first variable, and to emit a first input signal dependent on a value of the sensed first variable; and
a second ECU operatively connected to the first ECU;
wherein the first ECU comprises:
a signal receiver for receiving the first input signals, and an output for emitting a first output signal dependent on the first input signals, which first output signal determines the amount of first fuel supplied to the engine,
the second ECU being adapted to modify the first output signal when the engine is running in the second mode to produce a first modified signal and a second calculated signal; the first modified signal determining the amount of first fuel supplied to the engine when the engine is operating in the second mode, and the second calculated signal determining the amount of second fuel supplied to the engine when the engine is operating in the second mode, wherein the second ECU is operatively connected to the first ECU in both the first mode and the second mode.

2. A multi-mode engine system according to claim 1 wherein the first engine control unit is a master unit and the second ECU is a slave unit controlled by the first ECU.

3. A multi-mode engine system according to claim 1 wherein the first ECU control is adapted to control the timing of flow of first fuel into the engine when the engine is operating in the first mode, and the second ECU is adapted to control the timing of flow of both the first fuel and the second fuel into the engine when the engine is operating in the second mode.

4. A multi-mode engine according to claim 1 wherein the first fuel comprises diesel, the second fuel comprises natural gas (methane), and the first ECU comprises a diesel ECU.

5. A multi-mode engine system according to claim 4 wherein the engine comprises a plurality of first injectors for injecting the first fuel into the engine and a plurality of second injectors for injecting the second fuel into the engine, the output of the first ECU being adapted to emit a plurality of first output signals, each of which output signals is adapted to control a different one of the first injectors, the second ECU being adapted to modify each of the plurality of first output signals to produce a plurality of first modified signals and a plurality of second calculated signals when the engine is operating in the second mode, each of the plurality of first modified signals being adapted to control a different one of the first injectors when the engine is operating in the second mode.

6. A multi-mode engine system according to claim 1 further comprising:
a calculator for calculating the calorific content of a first amount of first fuel that would be supplied to the engine if the engine were running in the first mode, and for calculating the calorific content of a second amount of first fuel supplied to the engine when the engine is running in the second mode, a comparator for comparing the difference between the calorific content of the first amount of first fuel and the calorific content of the second amount of first fuel, the calculator being further adapted to calculate a required amount of second fuel to be supplied to the engine when the engine is running in the second mode in order to ensure that the overall calorific content of the second amount of first fuel and the amount of second fuel is substantially the same as the calorific content of the first amount of first fuel.

7. A multi-mode engine system according to claim 6 wherein the engine system comprises a plurality of first injectors and a plurality of second injectors, the calculator being adapted to calculate the calorific content of a first amount of first fuel that would be injected into the engine by a first injector if the engine were running in the first mode, and the calorific content of a second amount of first fuel to be injected into the engine when the engine is running in the second mode and to calculate a required amount of second fuel to be injected into the engine when the engine is running in the second mode.

8. A multi-mode engine system according to claim 7 wherein the second ECU comprises a signal returner for returning the first output signals to the first ECU in an unmodified form when the engine is running in either the first mode or the second mode.

9. A multi-mode engine system according to claim 7 further comprising a plurality of second sensors operatively connected to the second ECU.

10. A multi-mode engine system according to claim 7 further comprising a λ sensor adapted to measure the amount of oxygen present in exhaust gases emitted from the engine, the λ sensor being operatively connected to the second ECU in a closed loop.

11. A multi-mode engine system according to claim 1 further comprising a first trigger for triggering the engine system to switch from the first mode to the second mode.

12. A multi-mode engine system according to claim 11 further comprising a second trigger for triggering the engine system to switch from the second mode to the first mode.

13. A method for operating an engine in either a first mode in which the engine is fuelled by a first fuel, or in a second mode in which the engine is fuelled by a second fuel, or by a mixture of the first fuel and the second fuel, the method comprising the steps of:
  programming the engine to operate initially in the first mode;
  repeatedly sensing a plurality of first variables and obtaining a measured value for each sensed first variable, and emitting a first input signal dependent on the measured value of each sensed first variable;
  causing a first output signal to be emitted in dependence on the first input signals for controlling the amount of the first fuel supplied to the engine,
  switching the mode of operation to the second mode;
  modifying the first output signal to produce a first modified signal and a second calculated signal, the first modified signal determining the amount of first fuel supplied to the engine and the second calculated signal determining the amount of second fuel supplied the engine when the engine is running in the second mode, wherein the engine comprises a first ECU and a second ECU, the second ECU being operatively connected to the first ECU in both the first and the second mode.

14. A method according to claim 13 comprising the additional steps of controlling the timing of flow of the first fuel into the engine when the engine is the first mode, in dependence on the first input signals, and controlling the timing of flow of both the first fuel and the second fuel into the engine when the engine is running in the second mode in dependence on the first modified signal and the second calculated signal, respectively.

15. A method according to claim 13 wherein the first fuel comprises diesel, the second fuel comprising natural gas (methane), and the first ECU comprises a diesel ECU.

16. A method according to claim 15 wherein the engine comprises a plurality of first injectors for injecting the first fuel into the engine and a plurality of second injectors for injecting the second fuel into the engine, and the step of causing a first output signal to be emitted in dependence of the first input signals comprises the step of causing a plurality of first output signals to be emitted in dependence on the first input signals, the method comprising the further step of controlling each of the first injectors in dependence on a first output signal, and the step of modifying the first output signal to produce a first modified signal and a second calculated signal comprises the step of modifying the first output signals to produce a plurality of first modified signals and a plurality of second calculated signals, each of which first modified signals controls one of the first injectors, and each of which second calculated signals controls one of the second injectors, when the engine is operating in the second mode.

17. A method according to claim 13 comprising the further step of calculating the calorific content of a first amount of first fuel that would be supplied to the engine if the engine were running in the first mode,
  calculating the calorific content of a second amount of first fuel supplied to the engine when the engine is running in the second mode;
  comparing the calorific content of the first amount of first fuel and the calorific content of the second amount of first fuel to calculate an energy deficit;
  calculating a required amount of second fuel to be supplied to the engine when the engine is running a second mode in order to compensate for the energy deficit.

18. A method according to claim 17 wherein the engine system comprises a first engine control unit (ECU), and a second ECU comprising a slave unit operatively connected to the first ECU, the first output signal or signals being emitted by the first ECU, and the method comprises the further step of returning a signal to the first ECU in an unmodified form corresponding to each of the first input signals.

19. A method according to claim 17 comprising the further step of measuring the oxygen content in exhaust gases exhausted from the engine, and further modifying either the first modified signals or the second calculated signals or both the first modified signals and the second calculated signals depending on the measured oxygen content.

20. A method according to claim 14 comprising the further step of repeatedly sensing a plurality of second variables and obtaining a measured value for each sensed second variable, and emitting a second input signal dependent on the measured value of each sensed second variable.

* * * * *

UNITED STATES PATENT AND TRADEMARK OFFICE
CERTIFICATE OF CORRECTION

PATENT NO. : 8,412,439 B2
APPLICATION NO. : 12/733760
DATED : April 2, 2013
INVENTOR(S) : Warner et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 510 days.

Signed and Sealed this
First Day of September, 2015

Michelle K. Lee
*Director of the United States Patent and Trademark Office*